(12) United States Patent
Seymour et al.

(10) Patent No.: US 8,924,037 B2
(45) Date of Patent: Dec. 30, 2014

(54) FUEL-FILL AREA DATA PORT

(75) Inventors: Shafer Seymour, Bartlett, IL (US); Robert Gee, Lake Barrington, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 898 days.

(21) Appl. No.: 13/015,181

(22) Filed: Jan. 27, 2011

(65) Prior Publication Data

US 2012/0197460 A1    Aug. 2, 2012

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B67D 7/14* | (2010.01) |
| *H01Q 1/32* | (2006.01) |
| *H01Q 1/22* | (2006.01) |
| *G06Q 20/32* | (2012.01) |
| *B67D 7/34* | (2010.01) |
| *G07F 15/04* | (2006.01) |
| *H04B 5/00* | (2006.01) |
| *G07F 13/02* | (2006.01) |

(52) U.S. Cl.
CPC .............. *B67D 7/145* (2013.01); *H01Q 1/3291* (2013.01); *H01Q 1/22* (2013.01); *G06Q 20/3278* (2013.01); *B67D 7/348* (2013.01); *G07F 15/04* (2013.01); *H04B 5/0031* (2013.01); *G07F 13/025* (2013.01)
USPC .......................................................... 701/1

(58) Field of Classification Search
CPC .............. B67D 2007/0442; B67D 2007/0455; B67D 7/0401; B67D 7/348; G05D 1/0234; G05D 1/0255; G05D 1/028
USPC ............................................................. 701/1
See application file for complete search history.

(56) References Cited

U.S. PATENT DOCUMENTS

| | | | |
|---|---|---|---|
| 2004/0095230 A1* | 5/2004 | Li et al. ..................... | 340/426.16 |
| 2010/0265033 A1 | 10/2010 | Cheung | |
| 2011/0078092 A1* | 3/2011 | Kim et al. ..................... | 705/412 |

FOREIGN PATENT DOCUMENTS

| | | |
|---|---|---|
| EP | 0982264 A1 | 3/2000 |
| WO | 01/03983 A1 | 1/2001 |
| WO | 2009/050662 A1 | 4/2009 |

OTHER PUBLICATIONS

International Search Report dated Apr. 3, 2012, from corresponding International Patent Application No. PCT/US2012/022146.

\* cited by examiner

*Primary Examiner* — Maceeh Anwari

(57) ABSTRACT

Near field communications devices provide wireless connectivity between vehicles and fueling stations by which vehicle fuel-related information can be exchanged. The exchanged information can include the type of fuel required by the vehicle and thus reduce the likelihood of an improper fuel being introduced to the vehicle. Vehicle fuel related information also includes an amount of fuel required to fill the vehicle's fuel reservoir, an amount of fuel required for the vehicle to travel to a particular location or distance, an amount of fuel received during previous refueling sessions, the identity of the vehicle, and vehicle operator fueling preferences. It can also include the location of the vehicle relative to a fueling station or fuel pump.

10 Claims, 6 Drawing Sheets

FUEL-FILL AREA DATA PORT

BACKGROUND

Motor vehicles in use today can use a variety of different fuels. Such fuels include gasoline, diesel and "bio-diesel" but they also include liquefied natural gas or LNG, liquid propane or LP gas. Hydrogen might someday also be used as fuel for motor vehicles.

A potential problem with the advent of new and different types of fuels for motor vehicles is inadvertent or improper selection when refueling a vehicle. By way of example, adding used cooking oil as a "bio diesel" fuel into the fuel tank of a motor vehicle equipped with a conventional diesel engine can lead to a costly repair, i.e., removing congealed biodiesel from a fuel system incapable of processing it. An apparatus that prevents or reduces the likelihood of an improper fueling would be an improvement over the prior art.

DETAILED DESCRIPTION

Figure 1:
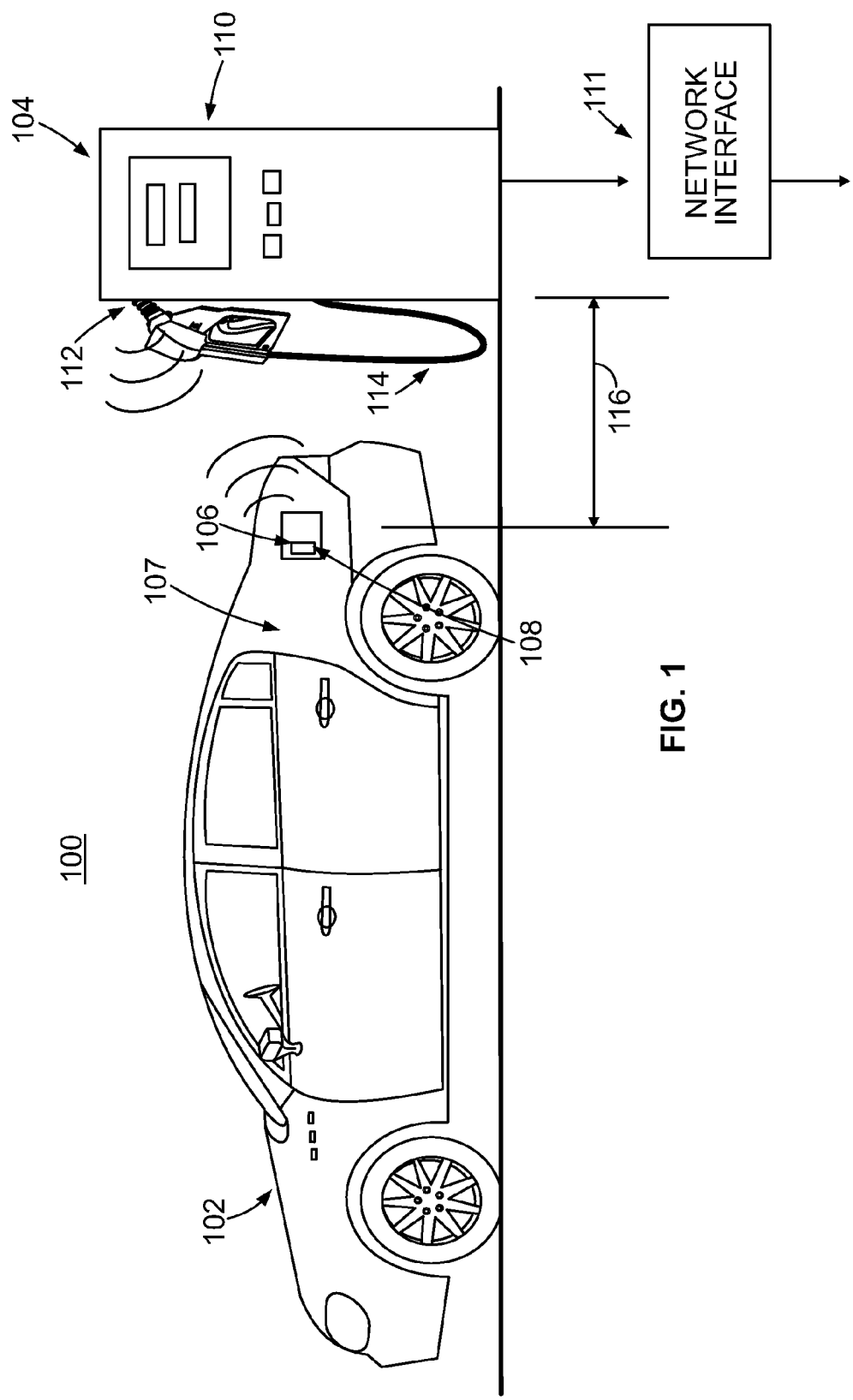
FIG. 1 is a diagram of a motor vehicle and fueling station.

FIG. 1 depicts a motor vehicle fueling system 100. The system 100 is comprised of a motor vehicle 102 and a fueling station 104, both of which are described more fully below. The motor vehicle 102 depicted in the figure is an automobile, however, the system 100 can also be used with motorcycles and trucks.

The motor vehicle 102 depicted in the figure is refueled with liquid fuels such as gasoline, diesel, biodiesel, LP, LNG or liquified hydrogen. Fuel is provided to the vehicle 102 through a refueling port, not visible in FIG. 1, which is accessible through an access door 106, behind which is located a near-field communications device 108.

The fueling station 104 is comprised of a liquid fuel pump 110. A liquid fuel for the vehicle 102 is dispensed through a nozzle 112 connected to the pump 110 through a flexible hose 114. The hose 114 has a finite length. If the distance 116 between the fuel refill access door 106 and the nozzle 112 happens to be greater than the length of the flexible hose 114, refueling the vehicle 102 is not possible. It is therefore desirable to properly position the vehicle 102 in proximity to the pump or fueling station 104. It is also desirable to help insure that the fuel to be dispensed into the vehicle 102 is the proper fuel.

Locating the vehicle 102 relevant to the pump 104 for refueling purposes can be facilitated through the use of one or more near-field communications devices or NFCDs 108 located on the vehicle 102 and one or more cooperating NFCDs connected to, or associated with, the fueling station 104. In FIG. 1, an NFCD is located inside the dispensing end of the nozzle 112, neither of which are visible in FIG. 1 because the nozzle 112 is depicted as being stored in the pump 110.

A near-field communications or NFC device is a very short-range, radio frequency (RF) communications protocol that enables the exchange of data between devices that are about four inches separated from each other. NFC technology is an extension of the ISO/IEC 14443 proximity-card standard of 2008, and which sometimes referred to as a proximity card or radio frequency ID or RFID. NFC combines the interface of a smart card and a reader into a single device. An NFC device can communicate with existing ISO/IEC14443 smart cards and readers as well as other NFC devices. Most NFC devices communicate via magnetic field induction. A loop antenna associated or connected to each device that is within range of another antenna associated with another device effectively forms and air-core transformer. They operate within the globally available and unlicensed radio frequency industrial-scientific-medical or ISM band of 13.56 Megahertz. The working distance for NFC devices can be up to approximately 20 centimeters depending in part on the antenna geometry with data rates as high as 850 Kilobits per second.

For purposes of this disclosure, NFC devices include ISO/IEC14443-compliant radio frequency communications devices. Such devices provide two-way radio frequency communications across distances that are limited to less than about 50 centimeters. Other embodiments of near-field communications devices include those which are incapable of communicating with each other at distances greater than about 1 meter.

Figure 2:
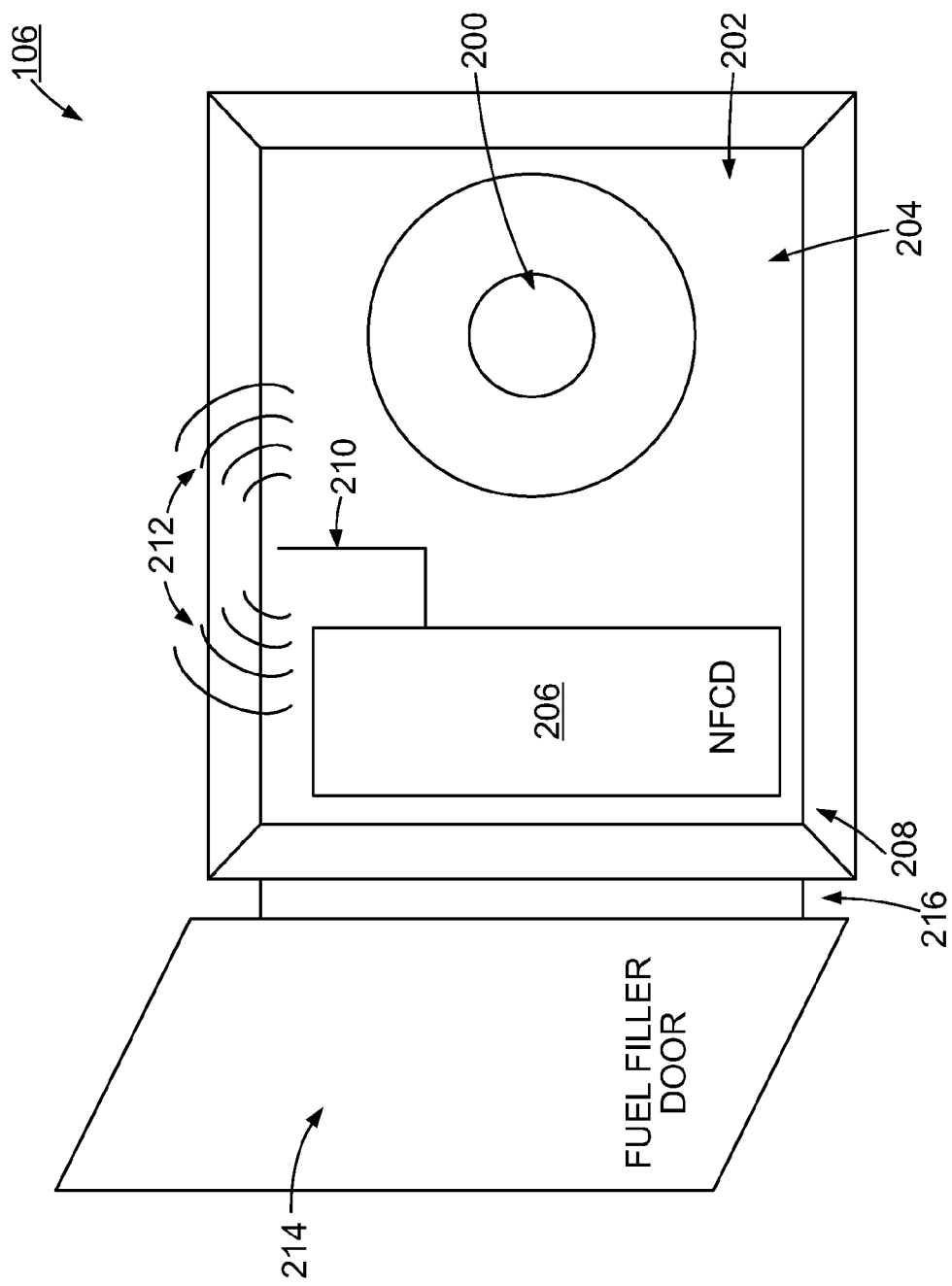
FIG. 2 is a diagram showing a near-field communications device within a fueling port of the motor vehicle depicted in FIG. 1.

FIG. 2 depicts the fuel re-fill access port 106 shown in FIG. 1. The fuel re-fill access port 106 is comprised of a filler neck opening 200 configured to receive the nozzle 112 of the fueling station pump 110. As a design choice, the filler neck opening 200 is located to the right-hand side 202 of a substantially cuboid-shaped compartment 204 set into the side of the fender 107 of the vehicle 102. A near field communications device 206 compliant with ISO/IEC14443 published in 2008 and derivatives thereof is mounted inside the cuboid-shaped compartment 204 along the left-hand side 208 of the compartment 204. An antenna 210 extends outwardly from the NFCD 206, which transmits and receives radio frequency signals. The wave fronts of the RF signals are identified by reference numeral 212. The contents of the cuboid compartment 204 are concealed and secured by a door panel 214 attached to the fender 107 of the vehicle 102 by a hinge 216.

In one embodiment, the NFCD 206 is an active device. It is powered by the vehicle's battery, not shown. It transmits radio frequency signals from a transmitter. It also has a receiver that is also powered by the vehicle 102. The transmitter and receiver of the NFCD 206 are well known to those of ordinary skill in the communications art. Further description of them is therefore omitted for brevity.

Figure 3:
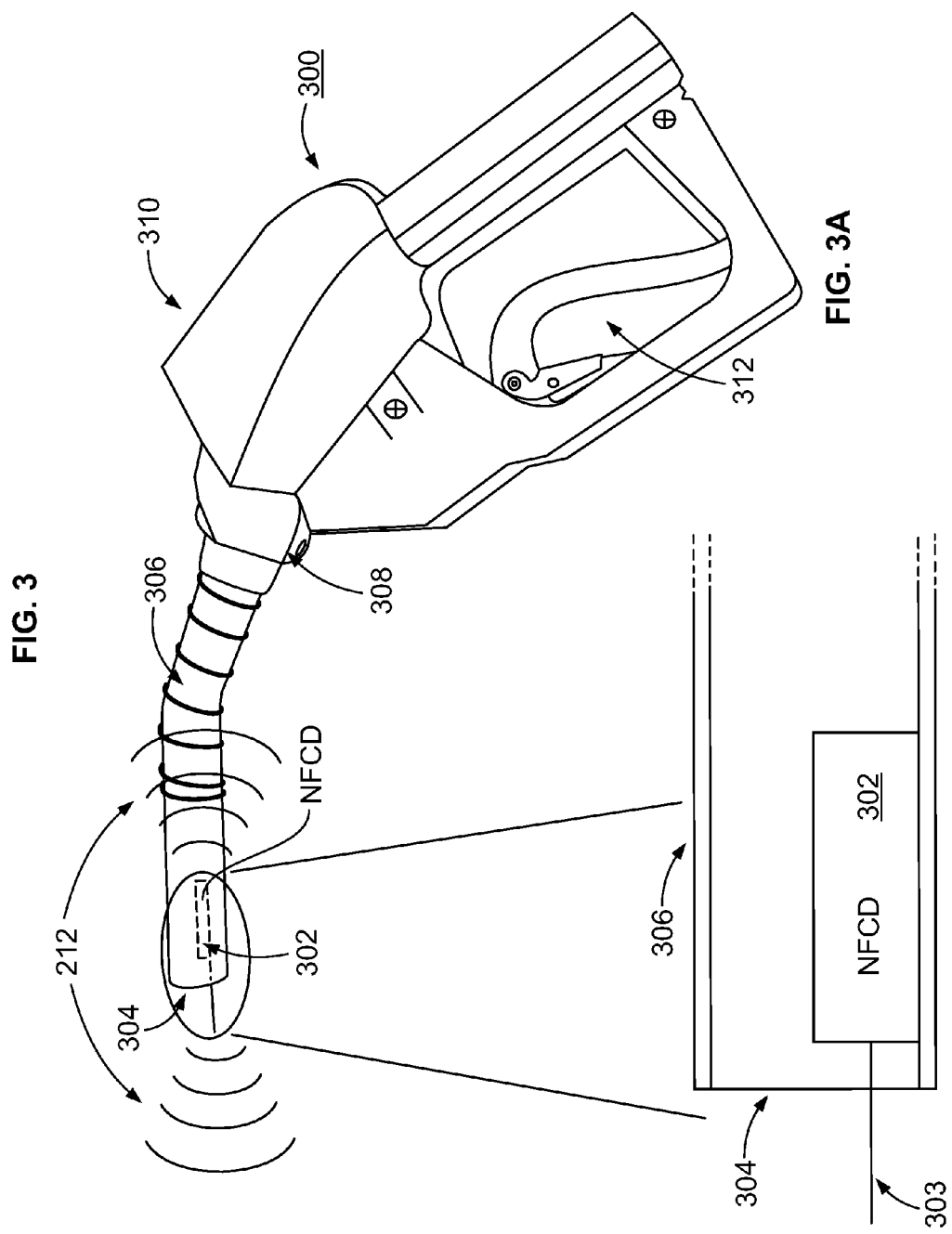
FIGS. 3A and 3B show a fueling nozzle for use at a fueling station and having a near-field communications device installed therein.

FIG. 3A is a diagram of a prior art fuel filler nozzle 300 provided with a near-field communications device 302 located inside and at the distal end 304 of a fueling tube 306 through which a liquid, i.e., non-pressurized, fuel for the vehicle 102 flows during refueling. The proximal end 308 of the fueling tube is mounted into a handle body 310. A valve mechanism inside the handle body 310 and not visible in FIG. 3A is actuated by lifting up a handle 312 that operates the valve mechanism.

FIG. 3B is an isolated view of the distal end 304 of the fueling tube 306. The near field communications device 302 is mounted inside the tube 306 such that a small antenna 303 projects outwardly past the distal end 304. Radio frequency energy can thus be received by the NFCD 302 through its antenna 303. Signals are transmitted and received by the NFCD 302 and exchanged with the NFCD 206 attached to the motor vehicle 102. By pre-programming the NFCD 302 within the filler nozzle 300, it is possible for the motor vehicle 102 and the fueling station 104 to exchange information pertinent to the vehicle fuel and its refueling needs. An interface 111 to the Internet provides connectivity by which fueling information can be sent to and received from the fueling station 104 and thus the vehicle 102 as well.

Using the near field communications devices described above and well-known communications protocols, the NFCD 206 attached to the vehicle 102 can exchange with the fueling station 104, vehicle fuel-related information that includes the vehicles separation distance or proximity to the fueling station 104. Vehicle location and its distance from the pump 110 can be readily determined by the existence of, or the inability to establish, a communications session between vehicle-mounted and fueling station mounted NFC devices.

By coupling the vehicle-mounted NFCD 206 to a vehicle controller, and as described more fully below in connection with FIG. 5 and FIG. 6, vehicle fuel-related information can be exchanged with the fueling station 104. Vehicle fuel-related information exchanged between the two NFC devices can include the type of fuel required by the vehicle 102, the amount of fuel required to fuel the vehicle, an amount of fuel required for the vehicle to travel one or more particular distances, an amount or price of fuel received during previous refueling sessions, the identity of the vehicle and/or its owner, an account from which payment will be made for the fuel provided to the vehicle and the maximum price of the fuel either on a per volume, per weight or per unit energy basis or a contracted fuel price to be charged to the vehicle owner or operator by the fuel supplier.

Figure 4:
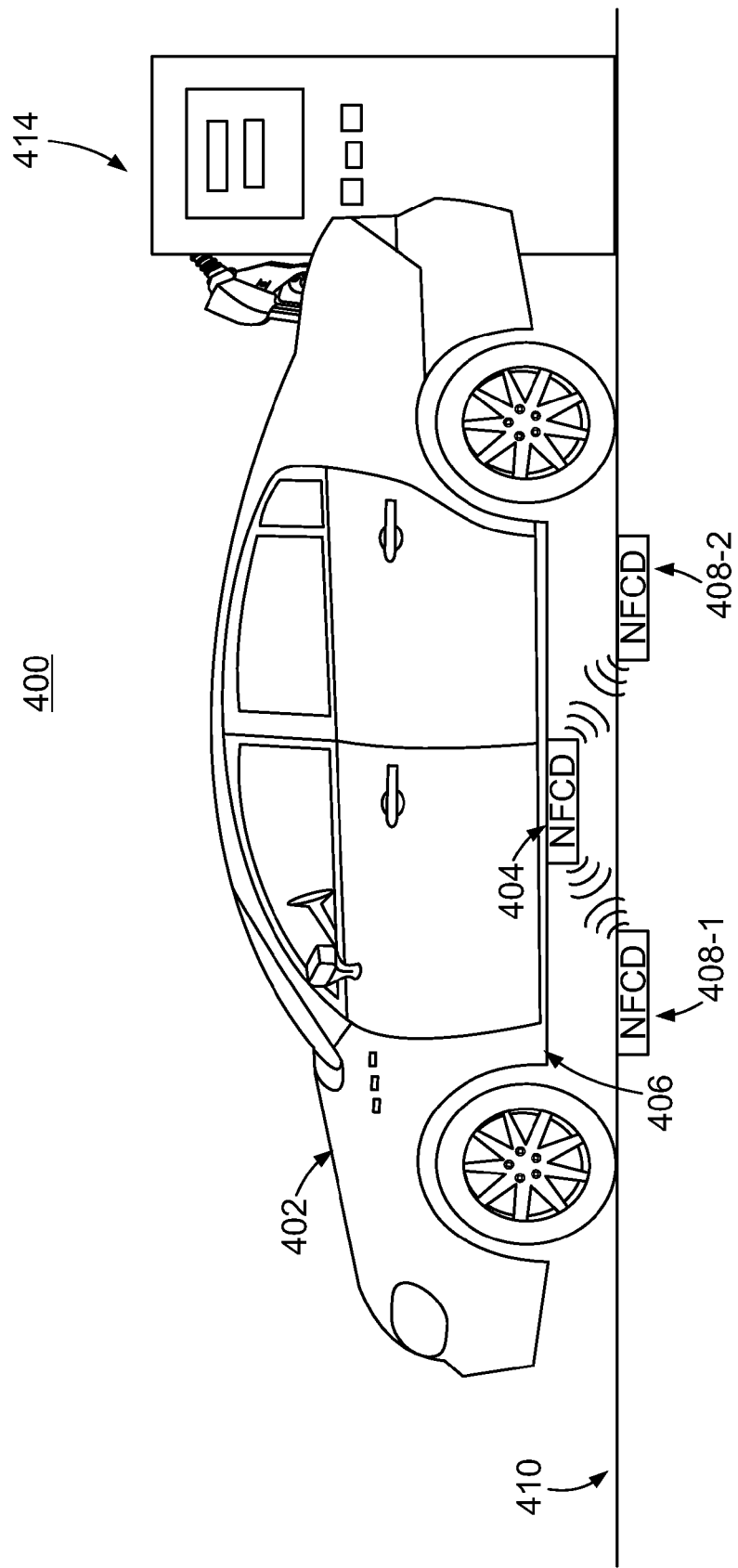
FIG. 4 is a diagram showing the use of near-field communications devices in a fueling station to locate a vehicle.

FIG. 4 depicts an alternate embodiment of a motor vehicle refueling system 400. The system 400 depicted in FIG. 4 is comprised of a motor vehicle 402 having one or more near field communication devices 404 attached to the underside 406 of the vehicle 402. When the vehicle-mounted NFCDs 404 are within range of near field communication devices NFCD's 408-1 and 408-2 buried in the pavement 410 are within range of the vehicle-mounted NFCD 404, the vehicle 402 can be considered to be within a proper location for refueling the vehicle from a refueling pump 414. The vehicle fuel-related information described above can also be exchanged between the NFCD's depicted in FIG. 4. Information about fuel prices, availability and so forth can be provided to the pavement-mounted NFCD's 408-1 and 408-2 through a direct connection, not shown, or from an external wireless programming device, not shown but well-known to those of ordinary in the communications art.

An advantage of the fueling system 400 shown in FIG. 4 over that depicted in FIG. 1 is that the near field communications devices being positioned at pre-determined locations relative to the pump 414 enable the system 400 to determine when the vehicle is properly position relative to the pump 414.

Figure 5:
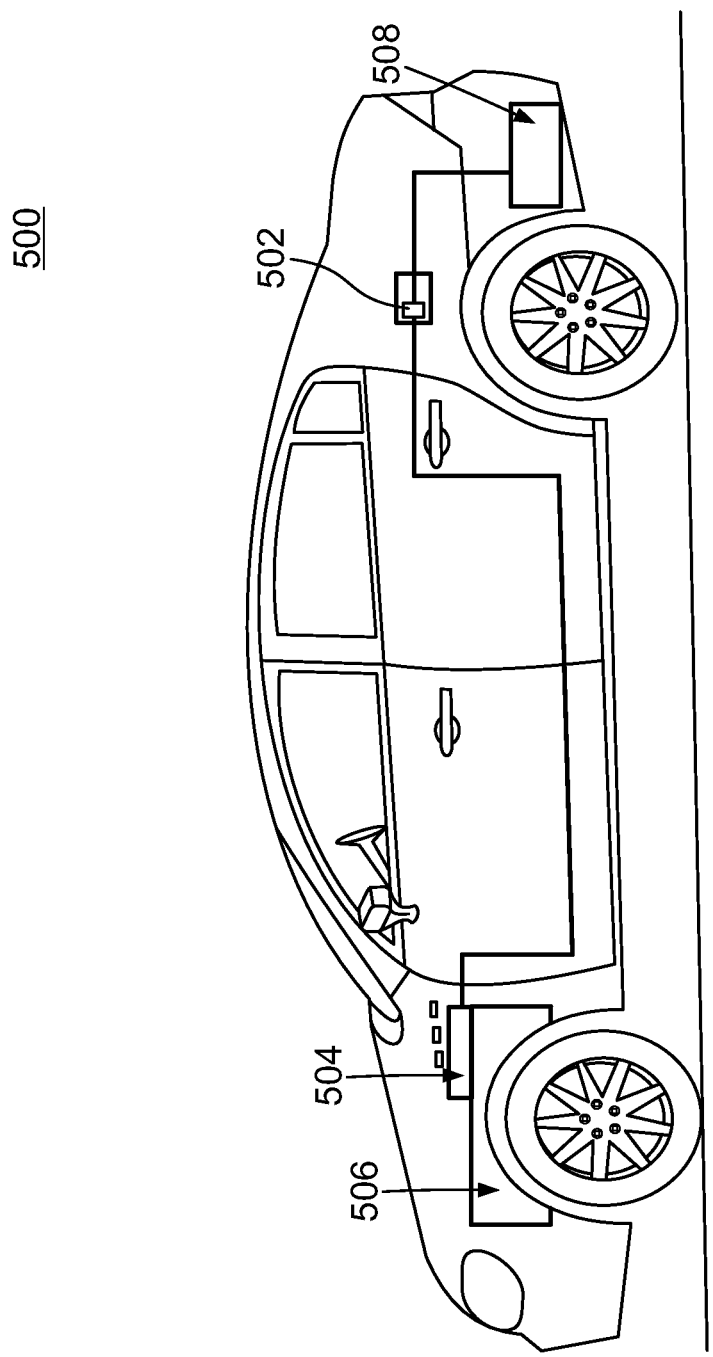
FIG. 5 is a block diagram of a motor vehicle having a fueling system comprised of a near-field communications device.

FIG. 5 is block diagram of a vehicle 500 having a near field communications device 502 within a fuel filler port, operatively coupled to a controller 504 for the vehicle. The controller 504 functions include controlling the vehicle's power train 506 and monitoring sensors that track the amount of fuel remaining in a reservoir 508. In a preferred embodiment, and using techniques well-known to those of ordinary skill in the art, the controller 504 keeps track of the amount of fuel in the reservoir 508 and the vehicle's fuel efficiency on either an instantaneous or average basis. The controller 504 thus provides to the NFC device 502, vehicle fuel-related information that can include, but which is not limited to the type of fuel required by the vehicle, the amount of fuel required to fill the reservoir 508, the amount of fuel required for the vehicle to travel to a particular location or distance, the amount of fuel received during previous refueling sessions, the identity of the vehicle, and vehicle operator fueling preferences.

In one embodiment, vehicle operator fueling preferences include one or more credit card accounts from which funds can be debited to pay for fuel. Vehicle operator fueling preferences can also include a maximum amount or rate that the vehicle operator is willing to pay. Fueling preferences can also be a contracted-for or agreed-upon price that a fuel supplier will provide fuel to the vehicle for the operator.

In one embodiment, the controller 504 is provided with program instructions which when executed by the controller inhibit the reception of fuel of an improper type. An electrically-actuated interlock is provided to the fill neck opening 200 which prevents the insertion of a fuel filler nozzle 300 of an improper type or size in order to prevent the vehicle from being refueled with an improper material.

Figure 6:
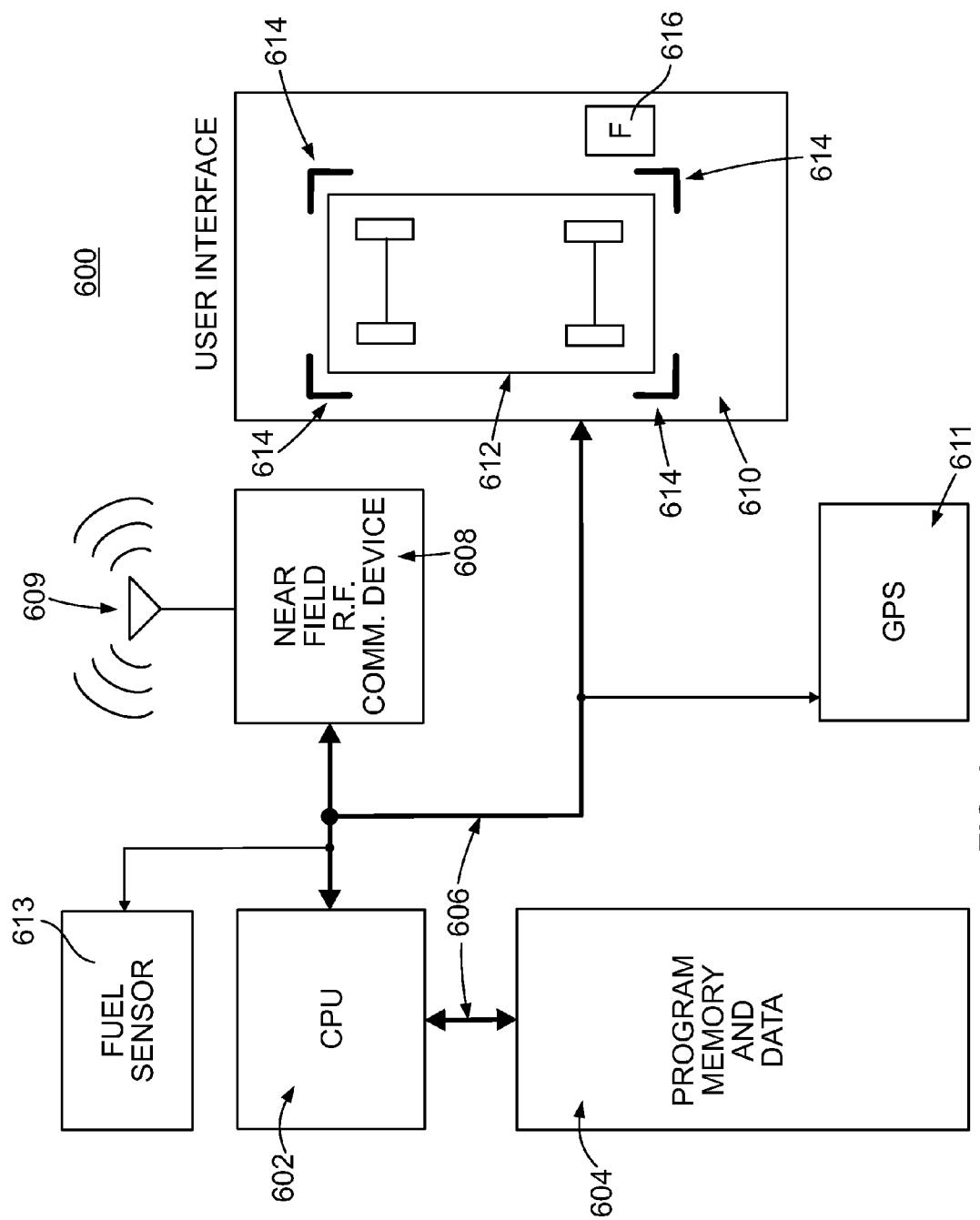
FIG. 6 is a block diagram of a vehicle fueling system for use in motor vehicles.

FIG. 6 is a block diagram of a motor vehicle fueling system 600. The system 600 is comprised of a small computer or central processing unit 602 operatively coupled to a memory device 604 through an address and control bus 606. The CPU 602 is also operatively coupled to and thereby controls a near field communications device 608 also via the address and control bus 606. Fuel sensor 613 provides information about fuel remaining in a fuel reservoir and is also coupled to the bus 606. A global positioning system or GPS 611 provides the vehicle's location as well as a database of fueling stations and their locations relative to the vehicle.

The NFCD 608 exchanges fuel-related information through radio frequency waves that are transmitted from and received at an antenna 609. A user interface 610, embodied as a dashboard-mounted liquid crystal display panel, optionally provides a vehicle icon 612 and vehicle location icons 614 that provide a real-time location of the vehicle relative to a fueling station 616. The display of the location of the vehicle icon 612 relative to the placement icons 614 is achieved from signals exchanged between multiple NFCD's mounted on the vehicle or within the pavement and at least one interacting NFCD mounted in the pavement or on the vehicle respectively, such as those shown in FIG. 4.

The processor 602 reads program instructions that are stored in the memory device 604. Those programming instructions cause the processor 602 to control the NFCD device 608, the fuel sensor 613 and the GPS 611. They also cause the NFCD to transmit and receive fueling-related information as described above.

The NFCD 608 is preferably a device that is compliant with the aforementioned ISO/IEC standard 14443 published in 2008 and derivatives thereof. The NFCD 608 transmits fueling related information described above and which includes one or more of the vehicles proximity to the fueling station, a type of fuel required by the vehicle, an amount of fuel required to fully fuel the vehicle, an amount of fuel required for the vehicle to travel a particular distance, an amount of fuel received during previous fueling events, the identity of the vehicle, the price of the fuel and vehicle operator fueling preferences.

While the foregoing embodiments are described with respect to vehicles that use liquids that include gasoline, diesel, liquefied natural gas or LNG, liquefied petroleum gas or LP, the system described above is also usable with gaseous fuels that include hydrogen, compressed natural gas or compressed or liquid propane. Fueling stations are thus accordingly provided with near field communications device that will provide communications from a liquid fuel delivery nozzle or a gaseous fuel delivery nozzle.

Those of ordinary skill in the art will also recognize that the foregoing embodiments can also be readily used with electrically-powered vehicles whether the electric power is provided by a so-called hybrid drive train or a battery pack. When used with electrically-powered vehicles, the vehicle fuel-related information includes vehicle battery characteristics. Vehicle battery characteristics include the amount of charge remaining in a vehicle battery or battery pack, battery voltage rating, battery current rating, and a type of battery technology, e.g. lithium ion, nickel metal hydride or other battery technologies. In embodiments where the system is used with electrically powered vehicles, the fueling device of the fueling station can also be a replacement battery or battery charger.

In one embodiment, the fueling station depicted above can be provided with interfaces to data networks such as the Internet. Such a network interface 111 is depicted in FIG. 1 and facilitates the real-time or near real-time transfer of fueling information for a vehicle and the fueling station itself. The network interface 111 also provides or facilitates electronic payments effectuated by the wireless communications between the NFC devices in the vehicle and the fueling station.

The foregoing description is for purposes of illustration. The true scope of the invention is set forth in the appurtenant claims.

What is claimed is:

1. A motor vehicle comprising:
a re-fueling compartment having a hinged door;
a fuel re-fill access port inside the re-fueling compartment, the fuel re-fill access port being accessible when the hinged door is open and concealed when the hinged door is closed, the fuel re-fill access port being configured to receive a nozzle of a fueling station pump when the hinged door is open;
a first near field communications device inside the compartment, the first near-field communications device being configured to transmit near field radio frequency signals to, and receive near field radio frequency signals from, a second near field communications device located inside and at a distal end of a nozzle of a fueling station pump, the transmission and reception of near field radio frequency signals occurring after the hinged door is opened and after the second near field communications device enters into the re-fueling compartment and before insertion of the nozzle into the re-fill access port, said near field signals carrying vehicle fuel information between the first near field communications device and the second near field communications device.

2. The motor vehicle of claim 1 wherein the near field communications device is configured to transmit radio frequency signals over distances substantially equal to or less than 50 centimeters.

3. The motor vehicle of claim 1 wherein the near field communications device is configured to be incapable of transmitting radio frequency signals that can provide radio frequency communications with devices located beyond a distance substantially equal to 1 meter.

4. The motor vehicle of claim 1 wherein the vehicle fuel information comprises at least one of:
a type of fuel required by the vehicle;
an amount of fuel required to fully fuel the vehicle;
an amount of fuel required for the vehicle to travel a particular distance;
an amount of fuel received during a previous fueling; and
the price of the fuel.

5. The motor vehicle of claim 1, wherein the vehicle fuel information includes an account from which payment for the fuel provided to the vehicle will be made.

6. The motor vehicle of claim 1 wherein the near field communications device comprises a radio frequency transmitter, which is compliant with ISO/IEC standard 14443, published 2008, and derivatives thereof.

7. A motor vehicle fueling system comprised of:
a first near field radio frequency communications device located inside a compartment having a fuel re-fill access port, the compartment having a hinged door, which conceals the fuel re-fill access port and the first near field radio frequency communications device when the door is closed and which exposes the fuel re-fill access port and the first near field communications device when the hinged door is open, the first near field radio frequency communications device comprising a near field radio frequency transmitter and a near field radio frequency receiver;
a processor coupled to the first near field radio frequency communications device; and
memory coupled to the processor, the memory being configured with processor-executable program instructions, which when executed by the processor cause the first near field radio frequency communications device to transmit vehicle fueling-related information using the near-field radio frequency transmitter, to a second near field radio frequency receiver inside a distal end of a liquid fuel dispensing nozzle, additional program instructions causing the first near field radio frequency receiver to receive fueling-related information from a second near field radio frequency transmitter inside the distal end of the liquid fuel dispensing nozzle, the transmission and reception of vehicle fueling-related information occurring between the first and second near field communication devices after the second near field radio frequency receiver enters the compartment and prior to insertion of the nozzle into a fuel re-fill access port.

8. The motor vehicle fueling system of claim 7 wherein the first near field communications device is compliant with ISO/IEC standard 14443, published 2008, and derivatives thereof and wherein the near field radio frequency transmitter is incapable of transmitting radio frequency signals that can provide radio frequency communications with devices located beyond a distance substantially equal to 1 meter.

9. The motor vehicle fueling system of claim 8, wherein the first near field radio frequency communications device is configured to transmit vehicle fueling-related information comprising at least one of:
a type of fuel required by the vehicle;
an amount of fuel required to fully fuel the vehicle;
an amount of fuel required for the vehicle to travel a particular distance;
an amount of fuel received during a previous fueling; and
the price of the fuel.

10. The motor vehicle fueling system of claim 8, wherein the vehicle fueling-related information includes the identify of an account from which payment for the fuel provided to the vehicle will be made.

* * * * *